Jan. 16, 1940. K. C. BUGG Re. 21,320

LOCK

Original Filed Jan. 19, 1938 2 Sheets-Sheet 1

Inventor:
Kenly C. Bugg
By Aitchison, Hurley, Byron & Knight Attys.

Jan. 16, 1940. K. C. BUGG Re. 21,320

LOCK

Original Filed Jan. 19, 1938 2 Sheets-Sheet 2

Inventor:
Kenly C. Bugg,
By Wilkinson, Huxley, Byron & Knight
Attys

Reissued Jan. 16, 1940 Re. 21,320

UNITED STATES PATENT OFFICE 21,320

LOCK

Kenly C. Bugg, Fort Wayne, Ind., assignor of twenty-five per cent to Robert J. Jauch, Fort Wayne, Ind., and twelve and one-half per cent to Howard Somervell, Evanston, Ill.

Original No. 2,116,011, dated May 3, 1938, Serial No. 185,774, January 19, 1938. Application for reissue November 10, 1939, Serial No. 303,909

33 Claims. (Cl. 70—289)

This invention pertains to locking mechanism, and more particularly to sightless combination locks.

It is an object of this invention to provide a sightless combination lock wherein at least a part of the operating mechanism is positively positioned in a predetermined position for one direction of its movement.

Another object is to provide a combination lock wherein the combination is exactly determined for controlling the operating mechanism of the lock in one direction of rotation only. Unauthorized operation, or movement in an unpredetermined direction, serves to render the operation of the combination impossible.

Still another object is to provide a combination lock wherein maze members are provided permitting operation of certain forms of the lock regardless of the position of the mechanism, while other forms of the lock are susceptible of operation through substantially 179°.

Yet another object is to provide a combination lock wherein the maze is substantially trackless for certain movement of an operating element.

A further object is to provide a sightless combination lock susceptible of immediately positioning the lock at zero position, and wherein the operation may be effected through the sense of sound or feeling.

A still further object is to provide a sightless combination lock which depends upon the touch or sound to determine the proper operation of the lock, but will only register by touch or sound in one direction of operation.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1:
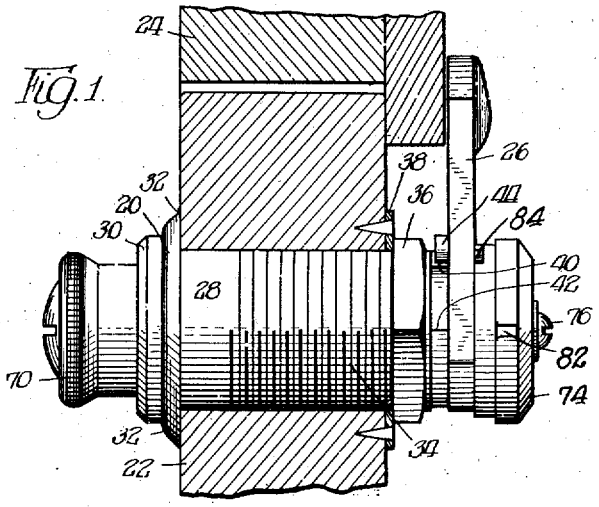
Figure 1 is an enlarged sectional elevation through adjacent relatively movable and stationary members as a door and associated jamb showing in side elevation one form of lock in locked position.
Figure 2:
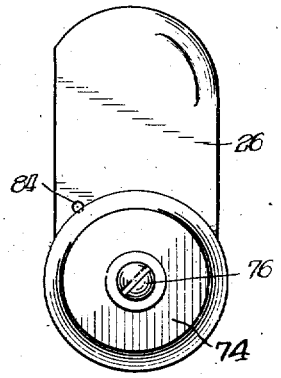
Figure 2 is an end elevation of the striker, and one of the track members of the lock shown in Figure 1, the same looking toward the left as viewed in said figure.

Referring first of all more particularly to the lock shown in Figures 1 to 9 inclusive, the lock is shown as applied, for example, to a cabinet. In this construction the lock 28 is fixedly supported, preferably on a movable part 22 of a cabinet adjacent a stationary part 24 of said cabinet in such a position that when fully locked the striker or locking member 26 of the lock will overlap a portion of the stationary member 24 to prevent movement of the movable member 22 toward the left or to open position as viewed in Figures 1, 3 and 9.

The lock consists essentially of the casing 28 provided at one end with the shoulder 30 providing a backing or engaging means for the plate 32 which is adapted to be disposed between said shoulder and the member 22. A portion of the casing is threaded as at 34 for receiving fastening means such as the nut 36, which is adapted to position the lock when applied to said threaded portion 34. A plate 38 is preferably disposed between the member 22 and the nut 36. The casing of the lock, when in applied position extends beyond the nut 36, and is provided with the spaced shoulders or stops 40 and 42 adapted to provide limiting means for the stop 44 provided on the striker 26, whereby the striker can only be moved a predetermined amount, which in the construction shown is 90°.

The casing is provided with the elongated aperture 46 extending therethrough and terminating at the operating end of the lock in a shouldered portion 48, said shouldered portion being provided with the slot 50 in substantial alignment with the stop 40. The revoluble member 52 extends through the elongated aperture 46, being rotatably mounted in the casing, said revoluble member being provided with the flange 54 rotatably mounted on the shoulder portion 48, said member extending through the casing, and being provided with the elongated aperture 56 terminating adjacent the inner end thereof with the threaded portion 58. The striker 26 is mounted on the projection 60 and is retained in place by the track member or maze 62, said member having an inwardly projecting threaded portion 64 adapted to be received by the threaded portion 58, and when said track member is secured in its innermost position it overlaps and forms a securing means for the striker.

The opposite end of the revoluble member is recessed as at 66, and the shaft 68 extends through the recess and is revolubly mounted with respect to the revolvable member 52 and the maze 62, extending beyond said maze. The shaft is provided at one end with the operating member 70, which may conveniently take the form of a knob, a portion of the operating member being journalled in the casing 30. The opposite end of the shaft is provided with the shoulder 72, and the plane track member, outer track, race or disc 74 is non-rotatably mounted on the end of the shaft as at 76, said track member being preferably provided with a flange 78 extending toward the track member 62, and an operating or spacing member such as the ball 80 is disposed between the track members 62 and 74. The flange 78 is provided with the cut-out or notched portions 82 adapted to have cooperative engagement with the pin 84 provided on the striker so that when the pin 84 is received in the notches 82 the operating member 70 can positively turn the striker.

A spring 86 is disposed in the recess 66, one end of said spring engaging the revoluble member, the other end of said spring engaging the disc 88, said disc being revolvably mounted with respect to the shaft 68 and frictionally engaging the operating member 70, said disc being provided with the depending or protruding member or pin 90 adapted to be received in the notch 92 provided in the flange 54 and the slot 50 provided in the casing, it being observed that said pin is only received in said notch and slot when the striker is in fully locked position, and when received in said slot and notch the revoluble member is held fixed with respect to the casing. Thus the spring 86, which is of the expansion type, frictionally holds the ball 80 between the track members.

The outer track member 74, as has already been explained, is a plane member. The inner track member or maze, which in the construction shown is cut or formed for a lock having a combination of 3—5—4, is provided with depressions or tracks disposed relative to each other to give this combination, one of the tracks terminating in a depression 94 adapted to receive the ball and permit the operating member 70, the shaft 68 and the track member 74 to move toward the left as viewed in Figure 3, to a position wherein the pin 84 may be received in the slot 82, at which position the pin 90 is withdrawn from the slot 50 to permit movement of the striker.

Figure 7:
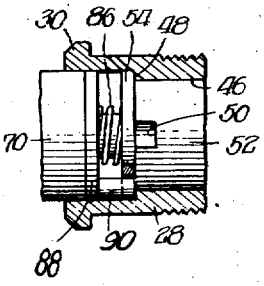
Figure 7 is a view corresponding to Figure 6 showing the parts in position wherein the striker is in a position other than locked position, such as fully opened position.
Figure 9:
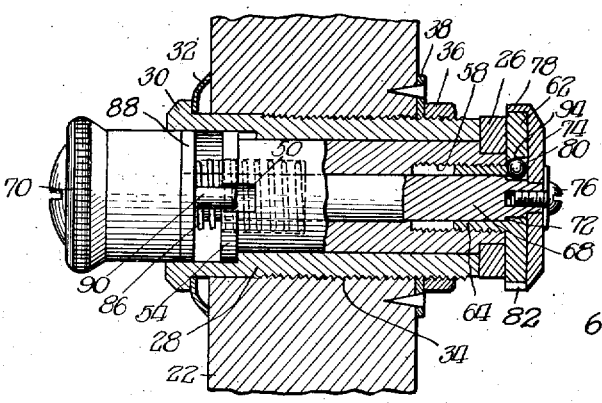
Figure 9 is an enlarged sectional elevation corresponding to Figure 3, the same showing the parts of the lock in position where the lock is in fully opened position.
Figure 8:
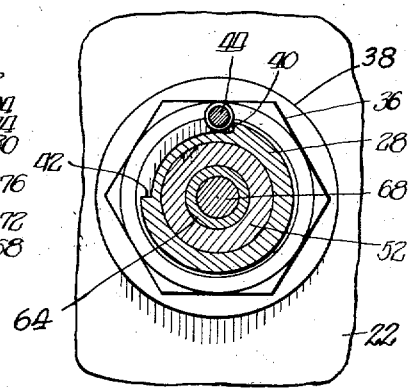
Figure 8 is an enlarged transverse sectional elevation taken substantially in the plane as indicated by the line 8—8 of Figure 3.

Any movement from the fully locked position causes the pin 90 to be placed above the shouldered portion 48 of the casing, such as shown in Figure 7, whereby it will be impossible to move the operating member, the shaft and race 74 toward the right or toward zeroized position as viewed in said figure, until the lock is returned to fully locked position. When the lock is returned to fully locked position, bodily movement, or movement of translation of the shaft 68 toward the right causes the shoulder 72 to move the ball 80 out of the depression 94 where it will immediately fall to its lowermost or zero position, after which it will be necessary to operate the lock in its set or predetermined combination before it can be again unlocked.

During operation of the lock, in the event a mistake is made in the combination, it can be immediately zeroized by moving the operating member toward the right as viewed in said figure, releasing the frictional engagement between the ball and the tracks which permits the ball to fall to its lowermost or zero position.

Figure 4:
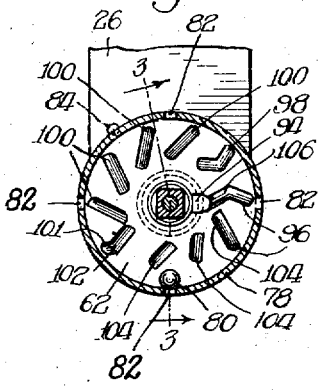
Figure 4 is an enlarged transverse sectional elevation taken substantially in the plane as indicated by the line 4—4 of Figure 3.
Figure 5:
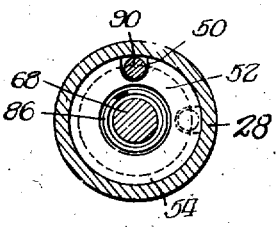
Figure 5 is an enlarged sectional elevation taken substantially in the plane as indicated by the line 5—5 of Figure 3.
Figure 6:
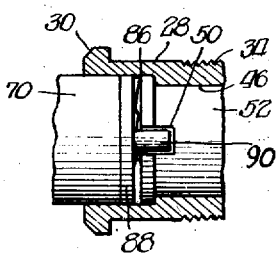
Figure 6 is an enlarged fragmentary sectional elevation through one part of the lock casing showing the locking disc and operating member in a position wherein the lock has been zeroized, this view being taken looking downwardly on the lock as viewed in Figure 3, and wherein the striker or locking member is in fully locked or predetermined position.

As stated above, the lock shown is adapted to operate on a 3—5—4 combination. The track or maze 62 as viewed from a zero and fully locked position shown in Figure 4, is provided with the first track 96, a second track 96 extending inwardly a sufficient distance to accommodate the outermost path of the ball and its second path of movement. The third track 98 is adapted to receive the ball and as the lock is set for a movement of the shaft in a counterclockwise direction as viewed in Figure 4, if the movement is reversed, that is, to a clockwise direction, the ball will move inwardly to the apex of the track 98. Reversal of the shaft to again rotate the disc 74 in a counterclockwise direction causes the ball to move over tracks 100 to the track 102, which is set in a reverse direction, being provided with a portion 101 disposed in the same direction as the tracks 100 so that the correct combination is set up; i. e., in the lock shown it is impossible with track portion 101 to count from zero to eight and operate through the second path of movement. Again reversing the movement of the disc 74 or shaft 68 at the track 102 causes the ball to move inwardly to its third path of movement, whereupon the shaft 68 and disc 74 are again moved in a counterclockwise direction to move the ball in its third path of movement over the track 104, the third depression 104, in the illustration shown, being a part of depression 96. In the fourth position of the ball it is received in the track 106, which is shown as angularly disposed with respect to the track 96, and a reversal of movement to a clockwise direction causes the ball to move into the depression, whereby the disc 74 will approach track member 62 with a consequent operation of the remaining parts of the lock to permit operation of the striker.

In the event that the lock is not operated correctly, that is, if reversal of movement of the shaft occurs before the proper number of tracks have been passed, or before the ball has moved its proper distance, such reversal will cause the ball to move outwardly, whereupon the lock must be zeroized before the combination can be performed. It is to be noted that with this construction it is not necessary to rovide circular tracks for the ball, as the ball will roll in true circles in the construction illustrated, so that expensive circular tracks are obviated.

Figure 3:
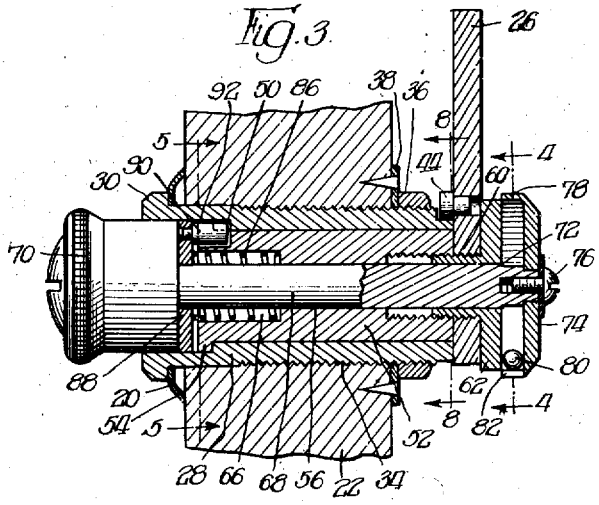
Figure 3 is an enlarged sectional elevation taken substantially in the plane of the longitudinal center line of certain of the parts of the lock shown in Figure 1, showing the movable element in zero position and the striker or locking member in locked position, the section through the track members being taken substantially in the plane as indicated by the line 3—3 of Figure 4.

It will be noted that when the ball 80 is in its zero position such as illustrated in Figures 3 and 4, there is a three-point contact between the ball 80, the maze 62, the plane surface of the disc 74 and the flange 78 of said disc. Such a three-point contact can be relieved, thus eliminating wear on the ball and preventing any telltale squeak by terminating the outer ends of the tracks 96, 98, 100, 101 (102) short or inwardly of the periphery of the maze 62, or, in other words, said tracks are terminated so that when the ball 80 enters the first track 96 it will move slightly away from the flange. Having once been moved away from the flange there will just be a contact between the ball 80, the maze 62 and the plane surface of the disc 74.

Figure 10:
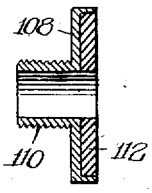
Figure 10 is an enlarged sectional elevation through one of the track members or mazes showing means for rendering the lock less audible in operation.

In certain forms of lock it is desirable to have as quiet a lock as possible, as for example a lock which might be mounted in a desk. In such case the desk virtually would provide a sounding board for the lock. In this instance the maze member shown in Figure 10 may be used. This maze member 108 is provided with the threaded portion 110 similar to the threaded portion 64, but the maze, or depressions and tracks, is disposed in the insert 112 provided on the face of the maze, this insert preferably being made of Bakelite, hard rubber, zinc or an alloy thereof, aluminum alloy, or some other like material. With the form of lock as described it will be appreciated that it is susceptible of operation through substantially 179°.

Figure 11:
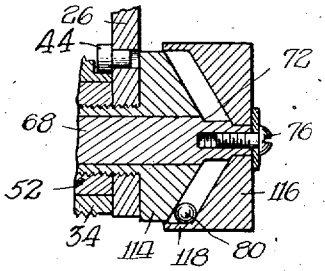
Figure 11 is a fragmentary sectional elevation of one end of the lock, such as shown in Figure 3, showing a modified form of the maze or track members.
Figure 12:
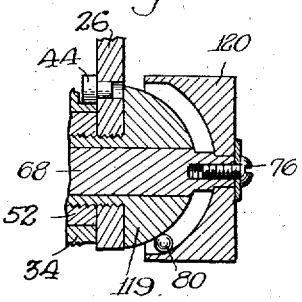
Figure 12 is a fragmentary sectional elevation of one end of the lock, such as shown in Figure 3, showing another modified form of the maze or track members.

The lock, however, may be of universal construction and operation, that is—operative at any angle, including the vertical, by the constructions illustrated in Figures 11 and 12. In the construction shown in Figure 11, the inner maze or track member 114 is substantially conical, being otherwise provided with the tracks and depression as shown in Figure 4. The outer track 116, which is correspondingly shaped, is secured to the shaft 68 as at 76, and is provided with the flange 118 corresponding to the flange 78, and is adapted to receive the pin 84 provided on the striker 26 as described.

In the construction shown in Figure 12, the inner maze 119 is provided with the depression and tracks similar to that shown in Figure 4, but is substantially spherical or of similar formation, the outer track 120 fastened to the shaft 68 as at 76 being correspondingly formed.

Figure 15:
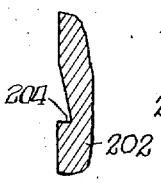
Figure 15 is an enlarged sectional elevation through one of the maze and track members, the same being taken substantially in the plane indicated by line 15—15 of Figure 14.
Figure 13:
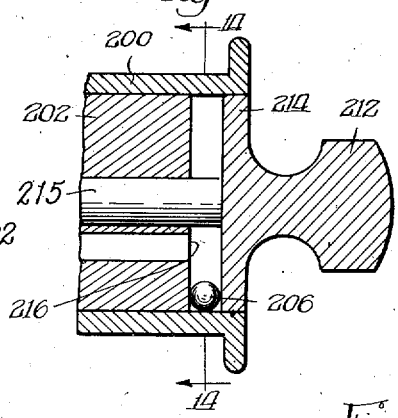
Figure 13 is an enlarged fragmentary sectional elevation of another form of lock embodying the invention.
Figure 14:
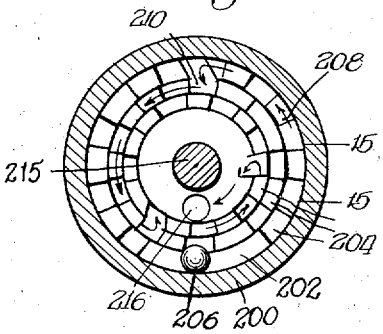
Figure 14 is an enlarged sectional elevation taken substantially in the plane indicated by the line 14—14 of Figure 13.

A different form of construction is illustrated in Figures 13, 14 and 15. In this construction the casing 200 is provided with the maze 202. The maze in this instance is provided with a plurality of circular tracks 204 for receiving the ball 206, the tracks being provided with notched portions 208 providing the audible sounds as the ball passes over them, and the ball enters adjacent tracks by reversal of movement of the ball when it is received in the cut back portions 210. The ball is rotated by the operating member or knob 212 provided with the outer or plane track 214 rotatable about the central shaft 215 and when the ball is operated in its proper sequence it is received at 216 where it can operate suitable mechanism for controlling the lock.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. A lock comprising a casing, spaced stops and a shouldered portion thereon, said shouldered portion having a slot in substantial alignment with one of said stops, a revoluble member oscillatably mounted in said casing having a locking member provided on one end thereof, said locking member having a stop adapted to be moved between said first named stops to limit the movement of said locking member, the opposite end of said revoluble member being recessed and having a flange overlapping said shouldered portion, said flange being provided with a notch in registration with said slot when said last named stop is in contact with one of said first named stops, a spring disposed in said recess, an operating member having a shaft extending through said revoluble member, a disc rotatably mounted on said shaft between said flange and said operating member and frictionally urged toward said operating member by said spring, said disc having a protruding member adapted to be received in said slot and notch in one position of operation, and to be received in said notch and to ride on said shouldered portion during another operation, a track member fixed to said revoluble member and having a depression adjacent the center thereof, angularly disposed spaced tracks formed in said track member arranged in a predetermined sequence and position relative to each other, a second track member secured to said shaft and having a flange overlapping said first track member and extending toward said locking member, a ball disposed between said track members, said spring urging said track members toward each other, said locking member and said second track member having interengaging means adapted to be in engagement when said ball is disposed in said depression to permit said locking member to be moved by said operating member, said tracks being so constructed and arranged that when the operating member is revolved in a predetermined sequence said ball will move into said depression, but if the operating member is not moved in said sequence the ball will move outwardly of the track members to break the sequence of operation of the lock, longitudinal movement of said operating member moving the ball from any position to a predetermined initial position.

2. A lock comprising a casing, spaced stops and a shouldered portion thereon, a revoluble member oscillatably mounted in said casing having a locking member provided on one end thereof, said locking member having a stop adapted to be moved between said first named stops to limit the movement of said locking member, an operating member having a shaft extending through said revoluble member, a track member fixed to said revoluble member and having a depression adjacent the center thereof, angularly disposed spaced tracks formed in said track member arranged in a predetermined sequence and position relative to each other, a second track member secured to said shaft and having a flange overlapping said first track member and extending toward said locking member, a ball disposed between said track members, said locking member and said second track member having interengaging means adapted to be in engagement when said ball is disposed in said depression to permit said locking member to be moved by said operating member, said tracks being so constructed and arranged that when the operating member is revolved in a predetermined sequence said ball will move into said depression, but if the operating member is not moved in said sequence the ball will move outwardly of the track members to break the sequence of operation of the lock, longitudinal movement of said operating member moving the ball from any position to a predetermined initial position.

3. A lock comprising a casing, spaced stops and a shouldered portion thereon, a revoluble member oscillatably mounted in said casing having a locking member provided on one end thereof, said locking member having a stop adapted to be moved between said first named stops to limit the movement of said locking member, an operating member having a shaft extending through said revoluble member, a track member fixed to said revoluble member and having a depression adjacent the center thereof, angularly disposed spaced tracks formed in said track member arranged in a predetermined sequence and position relative to each other, a second track member secured to said shaft and having a flange overlapping said first track member and extending toward said locking member, a ball disposed between said track members, means for urging said track members toward each other, said locking member and said second track member having interengaging means adapted to be in engagement when said ball is disposed in said depression to permit said locking member to be moved by said operating member, said tracks being so constructed and arranged that when the operating member is revolved in a predetermined sequence said ball will move into said depression, but if the operating member is not moved in said sequence the ball will move outwardly of the track members to break the sequence of operation of the lock, longitudinal movement of said operating member moving the ball from any position to a predetermined initial position.

4. A lock comprising a casing, spaced stops and a shouldered portion thereon, a revoluble member oscillatably mounted in said casing having a locking member provided on one end thereof, said locking member having a stop adapted to be moved between said first named stops to limit the movement of said locking member, the opposite end of said revoluble member being recessed and having a flange overlapping said shouldered portion, a spring disposed in said recess, an operating member having a shaft extending through said revoluble member, a track member fixed to said revoluble member and having a depression adjacent the center thereof, angularly disposed spaced tracks formed in said track member arranged in a predetermined sequence and position relative to each other, a second track member secured to said shaft and having a flange overlapping said first track member and extending toward said locking member, a ball disposed between said track members, said spring urging said track members toward each other, said locking member and said second track member having interengaging means adapted to be in engagement when said ball is disposed in said depression to permit said locking member to be moved by said operating member, said tracks being so constructed and arranged that when the operating member is revolved in a predetermined sequence said ball will move into said depression, but if the operating member is not moved in said sequence the ball will move outwardly of the track members to break the sequence of operation of the lock, longitudinal movement of said operating member moving the ball from any position to a predetermined initial position.

5. A lock comprising a casing, spaced stops and a shouldered portion thereon, said shouldered portion having a slot in substantial alignment with one of said stops, a revoluble member oscillatably mounted in said casing having a locking member provided on one end thereof, said locking member having a stop adapted to be moved between said first named stops to limit the movement of said locking member, the opposite end of said revoluble member being recessed and having a flange overlapping said shouldered portion, said flange being provided with a notch in registration with said slot when said last named stop is in contact with one of said first named stops, a spring disposed in said recess, an operating member having a shaft extending through said revoluble member, a disc rotatably mounted on said shaft between said flange and said operating member and frictionally urged toward said operating member by said spring, said disc having a protruding member adapted to be received in said slot and notch in one position of operation, and to be received in said notch and to ride on said shouldered portion during another operation, a track member fixed to said revoluble member and having a depression adjacent the center thereof, angularly disposed spaced tracks formed in said track member arranged in a predetermined sequence and position relative to each other, a second track member secured to said shaft and having a flange overlapping said first track member and extending toward said locking member, a ball disposed between said track members, means on said shaft for removing said ball from said depression, said locking member and said second track member having interengaging means adapted to be in engagement when said ball is disposed in said depression to permit said locking member to be moved by said operating member, said tracks being so constructed and arranged that when the operating member is revolved in a predetermined sequence said ball will move into said depression, but if the operating member is not moved in said sequence the ball will move outwardly of the track members to break the sequence of operation of the lock, longitudinal movement of said operating member moving the ball from any position to a predetermined initial position.

6. A lock comprising a casing, a locking member, a first track member thereon, a second track member spaced from said first track member and having rotating means therefor, separating means disposed between said track members, receiving means for receiving said separating means for permitting said rotating means to move said locking member, means for causing said separating means to be frictionally held between said track members whereby it will be moved in a predetermined path on said tracks, and directing means for directing movement of said separating means with respect to said receiving means according to a predetermined operation of said rotating means.

7. A lock comprising a casing, a locking member, a first track member thereon, a second track member spaced from said first track member and having rotating means therefor, separating means disposed between said track members, receiving means for receiving said separating means for permitting said rotating means to move said locking member, means for causing said separating means to be frictionally held between said track members whereby it will be moved in a predetermined path on said tracks, and directing means for directing movement of said separating means with respect to said receiving means according to a predetermined operation of said rotating means causing a perceptible indication of the movement of said separating means during movement of the separating means in one direction.

8. A lock comprising a casing, a locking member, a first track member thereon, a second track member spaced from said first track member and having rotating means therefor, separating means disposed between said track members, receiving means for receiving said separating means for permitting said rotating means to move said locking member, means for causing said separating means to be frictionally held between said track members whereby it will be moved in a predetermined path on said tracks, and directing means for directing movement of said separating means with respect to said receiving means according to a predetermined operation of said rotating means causing a perceptible indication of the movement of said separating means during movement of the separating means in one direction, movement of said directing means in another direction causing a perceptible indication of the arrested movement of the separating means.

9. A lock comprising a casing, a locking member movable between locked and unlocked positions, means for moving said lock, means rendering said first named means inoperative, said means being so constructed and arranged that said lock can be immediately conditioned for a predetermined operation by a movement of said first named means different from the movement of said first named means necessary to move said locking member.

10. In a lock, the combination of a casing, a locking member, an axially movable and rotatable member extending through said casing and being operatively associated with said locking member, a disc associated with said rotatable member, a track member having guiding means thereon, a ball disposed between said track member and said disc and adapted to be rotated in a predetermined manner by said rotatable and track members, axial movement of said rotatable member in one direction causing said ball to move to initial starting position.

11. In a lock, the combination of a casing, a locking member, an axially movable and rotatable member extending through said casing and being operatively associated with said locking member, a disc associated with said rotatable member, a track member having guiding means thereon, a ball disposed between said track member and said disc and adapted to be rotated in a predetermined manner by said rotatable and track members, axial movement of said rotatable member causing said ball to move to a position where it can start to move in said predetermined manner.

12. A lock comprising a casing, a locking member, an axially movable and rotatable member associated with said casing and relatively movable with respect thereto, a maze member, a disc member, a ball disposed between said maze and disc members, flexible means normally maintaining substantially constant frictional engagement between said ball and said maze and disc members, predetermined relative movement between said maze and disc members causing said ball to be moved progressively in one direction, reversal of the relative movement between said maze and disc members causing the ball to move in another predetermined manner.

13. A lock comprising a casing, a locking member, an axially movable and rotatable member associated with said casing and relatively movable with respect thereto and adapted to move said locking member after a predetermined movement of said rotatable member, a maze member, a disc member, a ball disposed between said maze and disc members, flexible means normally maintaining substantially constant frictional engagement between said ball and said maze and disc members, predetermined relative movement between said maze and disc members causing said ball to be moved progressively in one direction, reversal of the relative movement between said maze and disc members causing the ball to move in another predetermined manner.

14. A lock comprising a casing, a locking member, an axially movable and rotatable member associated with said casing and relatively movable with respect thereto, a maze member, a disc member, a ball disposed between said maze and disc members, flexible means normally maintaining substantially constant frictional engagement between said ball and said maze and disc members, predetermined relative movement between said maze and disc members causing said ball to be moved progressively in one direction, reversal of the relative movement between said maze and disc members occurring in a predetermined manner causing said ball to be positioned to be moved to a position to permit said rotatable member to operate said locking member.

15. A lock comprising a casing, an operating member, a locking member, a maze member, a track member, separating means interposed between said maze and track members and frictionally movable by said track member, a depression at one end of said maze member to receive said separating means whereby said track and maze members approach each other and said operating member may be moved to control said locking member.

16. A lock comprising a casing, an operating member, a locking member, a maze member, a track member, separating means interposed between said maze and track members and frictionally movable by said track member, a depression at one end of said maze member to receive said separating means whereby said track and maze members approach each other and said operating member may be moved to control said locking member, and means interposed between said operating member and said casing permitting disconnection of said operating and locking members only when said locking member is in a predetermined position.

17. In a lock, the combination of a casing, a locking member, an axially movable and rotatable member extending through said casing and being operatively associated with said locking member, a disc associated with said rotatable member, a track member having guiding means thereon, the track faces of said disc and track member being in parallel planes, a ball disposed between the track faces of said track member and disc and adapted to be rotated in a predetermined manner by said rotatable and track members, axial movement of said rotatable member in one direction causing said ball to move to a position where it can start to move in said predetermined manner.

18. In a lock, the combination of a casing, a locking member, an axially movable and rotatable member extending through said casing and being operatively associated with said locking member, a disc associated with said rotatable member, a track member having guiding means thereon, said disc and track member having track faces, a ball disposed between the track faces of said track member and disc and adapted to be rotated in a predetermined manner by said rotatable and track members, said track faces being so disposed that the tangent to said ball at the point of contact with said faces is at an angle to the axis of the rotatable member, said angle being greater or less than 90°, axial movement of said rotatable member in one direction causing said ball to move to a position where it can start to move in said predetermined manner.

19. In a lock, the combination of a casing, a locking member, an axially movable and rotatable member extending through said casing and being operatively associated with said locking member, a disc associated with said rotatable member, a track member having guiding means thereon, said disc and track member having track faces, a ball disposed between the track faces of said track member and disc and adapted to be rotated in a predetermined manner by said rotatable and track members, said track faces being so disposed that they are substantially conical, axial movement of said rotatable member in one direction causing said ball to move to a position where it can start to move in said predetermined manner.

20. In a lock, the combination of a casing, a locking member, an axially movable and rotatable member extending through said casing and being operatively associated with said locking member, a disc associated with said rotatable member, a track member, said track member having an insert of relatively soft or resilient material having guiding means formed thereon, a ball disposed between said disc and insert and adapted to be rotated in a predetermined manner by said rotatable and track members, axial movement of said rotatable member causing said ball to move to a position where it can start to move in said predetermined manner.

21. In a lock, the combination of a casing, a locking member, an axially movable and rotatable member extending through said casing and being operatively associated with said locking member, a disc associated with said rotatable member, a track member, said track member having an insert of hard rubber, a phenolic product or other sound deadening material, and having guiding means formed thereon, a ball disposed between said disc and insert and adapted to be rotated in a predetermined manner by said rotatable and track members, axial movement of said rotatable member causing said ball to move to a position where it can start to move in said predetermined manner.

22. A lock comprising a locking member, a first track member, a second track member spaced from said first track member, means for moving one of said track members relatively to the other track member, a separating means disposed between said track members, receiving means for receiving said separating means for permitting said first named means to operate said locking member, and directing means for directing movement of said separating means with respect to said receiving means according to a predetermined operation of said first named means, the directing means being so constructed and arranged that indications for said predetermined operation are perceptible in one direction of movement of said first named means but are not perceptible when said first named means is moved in another direction.

23. In combination, a relatively stationary member provided with spaced tracks predeterminedly arranged and separated by separating portions of said stationary member, one of said tracks communicating with receiving means, a movable member provided with a race member disposed adjacent said relatively stationary member, revoluble means disposed between said stationary and race members and adapted to move on said separating portions and in said tracks, movement of said movable member in a predetermined manner corresponding to the predetermining of said tracks causing said revoluble means to be moved into said receiving means whereby said race member may be moved toward said relatively stationary member.

24. A lock comprising a locking member, a first track member, a second track member spaced from said first track member, one of said track members having tracks arranged in a predetermined manner, separating means disposed between said track members, receiving means for receiving said separating means after said separating means has been moved in said predetermined manner, means for moving said separating means and locking member after movement of said separating means in said predetermined manner, tracks providing indication for said predetermined operation and effective to provide such indication in one direction of movement of said first named member, said tracks being ineffective to provide any indication of predetermined operation when said first named member is moved in another direction.

25. A lock comprising a pair of track members having spaced faces, one of said track members having a marginal flange extending toward the other of said track members, spacing means between said track members, locking means, the face of one of said track members having tracks therein arranged in a predetermined manner, one of said tracks communicating with receiving means for the spacing means, movable means for moving said spacing means in said predetermined manner to thereby move said spacing means to said receiving means whereby said movable means can operate said locking means, said tracks having the edges thereof spaced from the edges of said track members whereby when said spacing means is being moved in said predetermined manner after engagement with the first track of the track member having the tracks it will be spaced from said flange and only contact the faces of said track members.

26. In a lock, the combination of a casing, locking means, an operating member adapted to be associated with said locking means for controlling said locking means, and means interposed between said operating member and casing for preventing said operating member from being disconnected from said locking means until said locking means is in a predetermined position.

27. In a lock, the combination of a casing, locking means, an operating member adapted to be associated with said locking means for controlling said locking means, preventing means interposed between said operating member and casing for preventing said operating member from being disconnected from said locking means until said locking means is in a predetermined position, said preventing means including a member movable with said locking means and having a cut out portion, said casing having a corresponding cut out portion, said cut out portions being aligned when said locking means is in a predetermined position, a blocking member receivable in said cut out portions when aligned but of such size that it cannot enter the separate cut out portions, said blocking member preventing release of said locking means and said operating means when it is not positioned in said cut out portions, said operating means being released from said locking means when said blocking member is received in said aligned cut out portions.

28. A lock comprising a casing, a locking member, a first track member thereon, a second track member spaced from said first track member and having rotating means therefor, separating means disposed between said track members, receiving means for receiving said separating means for permitting said rotating means to move said locking member, means for causing said separating means to be frictionally held between said track members whereby it will be moved in a predetermined path on said tracks, and directing means spaced apart and angularly disposed with respect to the direction of rotation of said separating means for directing movement of said separating means toward said receiving means if the predetermined operation of said rotating means is performed but directing said separating means away from said receiving means and to inoperative position of the lock if said predetermined operation is not performed.

29. In a lock, the combination of a rotatable operating member, a track member, a member disposed adjacent thereto, a ball adapted to separate said track member and said adjacent member when it is being moved over said track member in a predetermined manner, a locking member, and means for bodily moving said operating member to permit said operating member to be actuated to move said locking member when said ball has been moved to a predetermined position.

30. In combination with a rotatable shaft, a member having a track disposed in a predetermined path to lead from an initial position to a final position, a ball disposed in said track, a member provided on said shaft engaging said ball for rotating said ball from initial to final position to permit relative movement of said first named member and said last named member toward each other.

31. In combination with a rotatable shaft, a track member having a track disposed in a predetermined path, a movable member movable over said track, said track having a starting point from which said movable member is adapted to be moved, said track having an end position defined by means for receiving said movable member, means engaging said movable member and separated from said track member when said movable member is moving over said track, and means for moving said second named means toward said track member when said movable member is received by said first named means.

32. In combination with a rotatable shaft, a track member having a track disposed in a predetermined path, a movable member movable over said track, said track having a starting point from which said movable member is adapted to be moved, said track having an end position defined by means for receiving said movable member, means engaging said movable member and separated from said track member by said movable member when said movable member is being moved over said track by rotation of said second named means, and means for moving said second named means toward said track member when said movable member is received by said first named means.

33. In a lock, the combination of locking means, means for controlling operation of said locking means, operating means for said second named means including a rotatable member adapted to be operated in a predetermined manner to condition said second named means for permitting said operating means to actuate said locking means, and means for preventing reconditioning said locking means to a position where said locking means cannot be actuated by said operating means, until said locking means is in a predetermined position, said means for preventing reconditioning being capable of being operative when said operating means can actuate said locking means, and is inoperative when said operating means is inoperative to actuate said locking means.

KENLY C. BUGG.